Patented Apr. 22, 1941

2,239,080

UNITED STATES PATENT OFFICE 2,239,080

INSECTICIDAL COMPOSITION

Gerald H. Coleman, Clarence L. Moyle, and John E. Livak, Midland, Mich., assignors to The Dow Chemical Company, Midland, Mich., a corporation of Michigan No Drawing. Application March 1, 1939, Serial No. 259,235

7 Claims. (Cl. 167—24)

This invention relates to insecticidal compositions and particularly concerns household sprays adapted for combating flies, mosquitoes, moths, and similar insects.

Sprays and dusts containing extracts of insecticidal plant products such as pyrethrum flowers, derris, cubé, barbasco, and the like, are widely used for the control of household insect pests. Sprays containing the pyrethrins have a quick paralyzing action on flies, but generally speaking, the ultimate kill does not closely approach the percentage knockdown. Compositions containing rotenone and related acid resin toxicants give a more permanent control but are relatively slow in their action, requiring a considerable period of time to kill insect pests contacted therewith. The foregoing and related toxicants are unstable when exposed to heat and light and lose effectiveness on storage, whereby there are certain limitations on their use.

We have discovered that when a small amount of a nuclear substituted phenoxy-alkyl thiocyanate is added to a spray composition comprising such toxicants as the pyrethrins and rotenone, an improved household spray composition results which is more stable to heat and light and has a faster paralyzing effect and greater lethal effect on insects than the ordinary pyrethrin or rotenone sprays. Such improved compositions give a quick knockdown and a kill on flies and related insects which more closely approximates the knockdown than do sprays heretofore employed for such purpose.

According to the invention, the nuclear substituted phenoxy-alkyl thiocyanates also may be employed as substitutes for pyrethrin and rotenone in spray compositions. Dispersions of these thiocyanate compounds have a high insecticidal toxicity, and are further advantageous in that they are substantially colorless and odorless, and are not appreciably decomposed on exposure to heat, light, and air. When these thiocyanates are used alone as toxicants in spray compositions, concentrations of from about 1 to about 10 grams per 100 milliliters of solution are most satisfactory. For use in stabilizing and/or fortifying non-aqueous pyrethrin or rotenone containing solutions, the thiocyanate is employed in amounts ranging between 0.5 and 5 grams per 100 milliliters of solution.

Nuclear substituted phenoxy-alkyl thiocyanates we have found particularly valuable as insecticidal toxicants and stabilizers are those having the following formula:

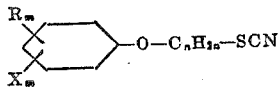

wherein R represents a hydrocarbon radical; X represents a member of the group consisting of alkyl, cycloalkyl, aralkyl, aryl, aryloxy, lower alkoxy, and alkenyl radicals, halogen, and hydrogen; $n$ represents an integer from 2 to 6, inclusive; each $m$ represents an integer not greater than 2; and the nuclear substituted phenoxy group, including substituents, contains at least 8 carbon atoms.

In the foregoing formula, the hydrocarbon radical shown as R may be ethyl, propyl, butyl, amyl, octyl, octadecyl, allyl, methallyl, butenyl, octenyl, cyclopentyl, cyclohexyl, methyl-cyclohexyl, phenylcyclohexyl, benzyl, phenylethyl, chlorobenzyl, methyl-benzyl, phenyl, tolyl, chlorophenyl, bromophenyl, naphthyl, and the like. R may also represent methyl when the nucleus is substituted by a plurality of hydrocarbon radicals. X may represent any of the foregoing hydrocarbon radicals or hydrogen, as well as such radicals as methoxy, butoxy, phenoxy, and toloxy, or bromine, chlorine, or iodine. The group —$C_nH_{2n}$— may be ethyl, propyl, butyl, amyl, or hexyl residues of normal, iso, secondary, or tertiary configuration.

The thiocyanates with which this invention is particularly concerned are prepared by reacting a nuclear substituted phenoxy-alkyl halide with an alkali metal thiocyanate. For example, a suitable aryloxy-alkyl bromide and sodium thiocyanate may be dispersed in alcohol and the mixture heated at from 75° to 90° C. under reflux to accomplish reaction. While any suitable amounts of the reactants may be employed, substantially equimolecular proportions thereof give the desired compounds in good yield. Following the reaction the mixture is treated in any suitable manner to isolate the aryloxy-alkyl thiocyanate. Co-pending applications Serial Nos. 237,058 and 237,059 by Coleman and Moyle; 237,276 by Livak, Coleman, and Moyle; and 237,275 by Livak, disclose in detail the preparation and properties of a large number of these compounds. These thiocyanate compounds are substantially odorless, comparatively innocuous as regards their effect on human beings and warm-blooded animals, and readily soluble in common organic solvents including petroleum distillates. Particularly advantageous is the fact that they do not cause irritation and dermatitis upon contact with living tissue and skin.

The aryloxy-alkyl halides employed as reactants, according to the foregoing procedure, may be prepared by reacting an alkali metal salt of a suitable phenol with an equimolecular proportion of an alkylene or polymethylene halide under such conditions of temperature and pressure as favor the replacement of a single halogen atom by the aryloxy group.

The terms "per cent" and "percentage" as employed in the specification and claims with reference to the composition of various spray materials, refer to grams per 100 milliliters thereof unless otherwise specified.

The invention is illustrated by the following examples:

Example 1

A 3.0 per cent solution of beta-(4-tertiary-butyl-phenoxy)-ethyl-thiocyanate (boiling at 158°–163° C. at 2.5 millimeters pressure and having the specific gravity 1.073 at 20°/4° C.) in a petroleum distillate having a boiling range of 345°–508° F. and a flash point of 137° F. was tested against three-day-old house flies according to the Peet-Grady method as described in Soap, 8, No. 4, 1932. This composition knocked down 98 per cent of the test insects in 10 minutes and killed 72 per cent and 81 per cent of the flies in 24 and 48 hours, respectively. The composition was substantially non-irritating to the nasal passages and mucous membranes of humans. For purposes of comparison a pyrethrin solution consisting of the extract of the toxic principles from 1 pound of pyrethrum flowers dissolved in 1 U. S. gallon of the petroleum distillate was employed as a control. This solution, when tested according to the above method, gave a knockdown of 100 per cent of the flies in 10 minutes and a kill of 50 per cent in 48 hours.

In a similar manner, other nuclear substituted phenoxy-alkyl thiocyanates were tested to determine their efficiency as fly spray toxicants. The data set forth in the following table is representative of the results obtained with solutions of such toxicants.

subjected to such conditions of light and heat as ordinarily favor decomposition of pyrethrin-containing spray compositions. An accelerated decomposition test was used wherein the subject compositions were exposed to the ultra-violet rays of a mercury arc lamp in a fadeometer, the lamp producing an intensity of light approximately equal to 4000 foot-candles, and the temperature of the samples during the test being at about 57° C.

In the initial test according to the Peet-Grady method, the half-strength pyrethrin control solution gave a knockdown of 97 per cent and a kill of 38 per cent, the pyrethrin composition comprising the gamma-(2-cyclohexyl-phenoxy)-propyl-thiocyanate, knocked down 99 per cent of the flies and killed 63 per cent, and the 0.8 per cent solution of the thiocyanate compound alone knocked down 60 per cent and killed 24 per cent of the test insects. After 72 hours exposure in the fadeometer, the observed kills were 20 per cent for the pyrethrin control solution, 25 per cent for the 0.8 per cent thiocyanate solution, and 71 per cent for the pyrethrin solution modified with the thiocyanate compound.

In an analogous test, beta-(2-bromo-4-ethyl-phenoxy)-ethyl-thiocyanate was substituted for the gamma-(2-cyclohexyl-phenoxy)-propyl-thiocyanate. The initial kill shown by the thiocyanate solution was 42 per cent and after exposure, 45 per cent. The pyrethrin solution modified with 0.8 per cent of the thiocyanate

| Compound | Per cent Concentration | Per cent knockdown in 10 minutes | Per cent mortality in 48 hours |
|---|---|---|---|
| Control pyrethrin solution | | 100 | 50 |
| Gamma-(2-cyclohexyl-phenoxy)-propyl-thiocyanate (boiling point 215°–218° C. at 3 millimeters pressure) | 3 | 99 | 94 |
| Beta-carvacroxy-ethyl-thiocyanate (boiling point 189°–196° C. at 10 millimeters pressure) | 3 | 100 | 92 |
| Beta-thymoxy-ethyl-thiocyanate (boiling point 173°–176° C. at 5 millimeters pressure) | 3 | 100 | 83 |
| Gamma-(2,4-ditertiary-butyl-phenoxy)-propyl-thiocyanate (boiling point 173°–175° C. at 2 millimeters pressure) | 4 | 85 | 80 |
| Beta-(3-phenyl-phenoxy)-ethyl-thiocyanate (boiling point 207°–212° C. at 2 millimeters pressure) | 3 | 100 | 76 |
| Gamma-(3-phenyl-phenoxy)-propyl-thiocyanate (boiling point 243°–246° C. at 5 millimeters pressure) | 3 | 92 | 74 |
| Beta-(2-phenyl-phenoxy)-ethyl-thiocyanate (boiling point 182°–186° C. at 3 millimeters pressure) | 3 | 89 | 67 |
| Gamma-(2-phenyl-phenoxy)-propyl-thiocyanate (boiling point 198°–200° C. at 2 millimeters pressure) | 3 | 100 | 88 |
| Beta-eugenoxy-ethyl-thiocyanate (boiling point 231°–232° C. at 17.8 millimeters pressure) | 3 | 100 | 89 |
| Beta-(2-bromo-4-ethyl-phenoxy)-ethyl-thiocyanate (boiling point 170°–171° C. at 2 millimeters pressure) | 2 | 100 | 92 |
| Gamma-(2-chloro-4-tertiary-butyl)-isobutyl-thiocyanate (boiling point 184°–185° C. at 2 millimeters pressure) | 2 | 96 | 93 |
| Beta-(5-bromo-carvacroxy)-ethyl-thiocyanate (boiling point 203°–208° C. at 5 millimeters pressure) | 3 | 100 | 73 |
| Beta-(4-tertiary-butyl-2,6-dichloro-phenoxy)-ethyl-thiocyanate (specific gravity 1.221 at 20°/4° C.) | 3 | 100 | 90 |
| Beta-(2-phenyl-4-chloro-phenoxy)-ethyl-thiocyanate (boiling point 218°–221° C. at 6 millimeters pressure) | 3 | 100 | 85 |
| Beta-(2-phenyl-4-tertiary-butyl-phenoxy)-ethyl-thiocyanate (boiling point 225°–230° C. at 5.3 millimeters pressure) | 3 | 99 | 84 |

Example 2

200 milliliters of the pyrethrin solution described in Example 1 was diluted with an equal volume of petroleum distillate to obtain a spray of half the pyrethrin content present in the original control solution. Gamma-(2-cyclo-hexyl-phenoxy)-propyl-thiocyanate was dissolved in a portion of this diluted pyrethrin control solution in amount of 0.8 per cent by volume thereof. A third spray material was prepared by dissolving 0.8 per cent of the thiocyanate compound in the petroleum distillate. Each of the foregoing solutions was tested to determine initial toxicity according to the Peet-Grady method and thereafter gave an initial control of 70 per cent and a kill of 62 per cent after 72 hours exposure.

By substituting other nuclear substituted phenoxy-alkyl thiocyanates for those disclosed in the foregoing examples, insecticidal compositions may be obtained of comparable efficiency. Representative of such compounds are beta-(2-cyclohexyl-phenoxy)-ethyl-thiocyanate boiling at 174°–178° C. at 3 millimeters pressure; beta-(dimethyl-phenoxy)-ethyl-thiocyanate boiling at 175°–190° C. at 10 millimeters pressure and prepared from a mixture of the isomeric xylenols; beta-(2-methyl-4-tertiary-butyl-phenoxy)-ethyl-thiocyanate boiling at 195°–198° C.

at 10 millimeters pressure; beta-(2-methyl-4-cyclohexyl-phenoxy)-ethyl - thiocyanate boiling at 210°-220° C. at 6-7 millimeters pressure; beta-(2 - chloro-4-tertiary - butyl-phenoxy) - ethyl-thiocyanate boiling at 230°-235° C. at 20 millimeters pressure; etc. Mixtures of the above compounds may be similarly employed, as, for example, the thiocyanates prepared from alkylated cresylic acid fractions, mixtures of isomeric halo-alkyl-phenols, cyclohexyl-phenols, and the like, or mixtures of aryloxyethyl and aryloxypropyl thiocyanates.

Instead of the pyrethrins, extracts of derris, cubé, barbasco, and related plant products may be used in combination with the nuclear substituted phenoxy-alkyl thiocyanates. In such compositions, the thiocyanate may serve as a solubilizing agent as well as stabilizing and increasing the toxicity of the solution. Besides petroleum distillates, other organic solvents such as benzene, ethylene dichloride, hydrogenated naphthalene, butyl alcohol, and the like may be employed.

The phrase "non-corrosive organic solvent" as employed in the following claims refers to any organic solvent material unreactive with and capable of dissolving the toxicants hereinbefore described and non-injurious to the skin and general health of humans.

Other modes of applying the principle of our invention may be employed instead of those explained, change being made as regards the materials or the amounts thereof employed, provided the compositions defined by any of the following claims or their equivalents be obtained.

We therefore particularly point out and distinctly claim as our invention:

1. An insecticidal spray comprising a non-corrosive organic solvent having dissolved therein a product selected from the class consisting of the extracts of pyrethrin- and rotenone-bearing plants, and as an added toxicant and stabilizer a compound having the formula

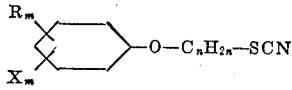

wherein R represents a hydrocarbon radical; X represents a member of the group consisting of alkyl, cycloalkyl, aralkyl, aryl, aryloxy, lower alkoxy, and alkenyl radicals, halogen and hydrogen; $n$ represents an integer from 2 to 6, incusive; each $m$ represents an integer not greater than 2; and the nuclear substituted phenoxy group contains at least 8 carbon atoms.

2. An insecticidal spray comprising a petroleum distillate having dissolved therein a product selected from the class consisting of the extracts of pyrethrin- and rotenone-bearing plants, and as an added toxicant and stabilizer an amount ranging between 0.5 and 5 grams per 100 milliliters thereof of a compound having the formula

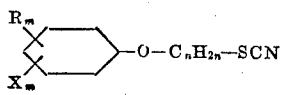

wherein R represents a hydrocarbon radical; X represents a member of the group consisting of alkyl, cycloalkyl, aralkyl, aryl, aryloxy, lower alkoxy, and alkenyl radicals, halogen and hydrogen; $n$ represents an integer from 2 to 6, inclusive; each $m$ represents an integer not greater than 2; and the nuclear substituted phenoxy group contains at least 8 carbon atoms.

3. An insecticidal spray comprising a non-corrosive organic solvent having dissolved therein a product selected from the class consisting of the extracts of pyrethrin- and rotenone-bearing plants and as an added toxicant and stabilizer a compound having the formula

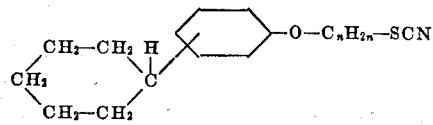

wherein $n$ represents an integer from 2 to 6, inclusive.

4. An insecticidal spray comprising a non-corrosive organic solvent having dissolved therein a product selected from the class consisting of the extracts of pyrethrin- and rotenone-bearing plants and as an added toxicant and stabilizer a compound having the formula

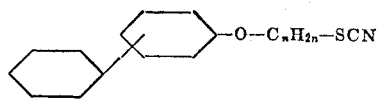

wherein $n$ represents an integer from 2 to 6, inclusive.

5. An insecticidal spray comprising a non-corrosive organic solvent having dissolved therein a product selected from the class consisting of the extracts of pyrethrin- and rotenone-bearing plants and as an added toxicant and stabilizer a compound having the formula

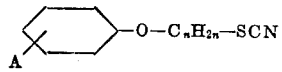

wherein A represents an alkyl radical containing at least 2 carbon atoms and $n$ is an integer from 2 to 6, inclusive.

6. An insecticidal spray comprising a non-corrosive organic solvent having dissolved therein a product selected from the class consisting of the extracts of pyrethrin- and rotenone-bearing plants and as an added toxicant and stabilizer a compound having the formula

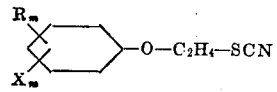

wherein R represents a hydrocarbon radical, X represents a member of the group consisting of alkyl, cycloalkyl, aralkyl, aryl, aryloxy, lower alkoxy and alkenyl radicals, halogen, and hydrogen, each $m$ represents an integer not greater than 2; and the nuclear substituted phenoxy group contains at least 8 carbon atoms.

7. An insecticidal spray comprising a non-corrosive organic solvent having dissolved therein a product selected from the class consisting of the extracts of pyrethrin- and rotenone-bearing plants and as an added toxicant and stabilizer a compound having the formula

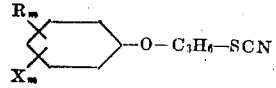

wherein R represents a hydrocarbon radical, X represents a member of the group consisting of alkyl, cycloalkyl, aralkyl, aryl, aryloxy, lower alkoxy and alkenyl radicals, halogen, and hydrogen, each $m$ represents an integer not greater than 2; and the nuclear substituted phenoxy group contains at least 8 carbon atoms.

GERALD H. COLEMAN.
CLARENCE L. MOYLE.
JOHN E. LIVAK.